United States Patent [19]

Charles

[11] Patent Number: 5,445,254

[45] Date of Patent: Aug. 29, 1995

[54] TENSIONING MECHANISM FOR VEHICLE AUXILIARY SEAT

[75] Inventor: Harlan W. Charles, Harper Woods, Mich.

[73] Assignee: General Motors Corporation, Detroit, Mich.

[21] Appl. No.: 234,029

[22] Filed: Apr. 28, 1994

Related U.S. Application Data

[62] Division of Ser. No. 994,156, Dec. 21, 1992.

[51] Int. Cl.⁶ .............................................. F16D 67/02
[52] U.S. Cl. ..................... 192/17 R; 192/53 G; 192/114 R; 297/230.14; 297/440.11; 254/199; 254/201
[58] Field of Search .............. 192/17 R, 12 B, 19, 192/48.3, 48.6, 48.92, 53 G, 53 H, 114 R; 297/248, 440.11, 230.14, 284.2; 254/199, 201, 206, 209, 241, 239

[56] References Cited

U.S. PATENT DOCUMENTS

| | | |
|---|---|---|
| 1,369,543 | 2/1921 | Reider . |
| 1,858,254 | 5/1932 | Uline . |
| 1,862,188 | 6/1932 | Legge ........................ 192/53 H X |
| 2,403,378 | 7/1946 | Kipela ........................ 192/48.6 X |
| 2,493,806 | 1/1950 | Dumas ........................... 155/33 |
| 2,540,232 | 2/1951 | Avila ............................ 192/53 H |
| 2,631,304 | 3/1953 | Brockmeier ................... 5/118 |
| 2,785,783 | 3/1957 | Homrig et al. ............... 192/114 R |
| 2,824,637 | 2/1958 | Unk et al. .................... 192/48.6 X |
| 2,846,038 | 8/1958 | Brownyer .................... 192/114 R X |
| 2,901,067 | 8/1959 | Nicholson ..................... 192/17 R |
| 3,196,703 | 7/1965 | Sinclair et al. .............. 192/53 H X |
| 3,273,877 | 9/1966 | Geller et al. ................. 267/89 |
| 3,291,270 | 12/1966 | Abel ............................ 192/17 R X |
| 3,298,484 | 1/1967 | Walischmiller ............... 192/17 R X |
| 3,399,883 | 9/1968 | McKey .......................... 267/89 |
| 4,303,151 | 12/1981 | Kolacz .......................... 192/114 R |
| 4,311,060 | 1/1982 | Kawaguchi et al. ......... 192/128 X |
| 4,311,062 | 1/1982 | Hamada et al. .............. 192/48.6 X |
| 4,545,614 | 10/1985 | Abu-Isa et al. ............... 297/284 |
| 5,069,079 | 12/1991 | Vadervoort ................... 192/53 H X |

FOREIGN PATENT DOCUMENTS

424019 8/1947 Italy .

*Primary Examiner*—Andrea L. Pitts
*Attorney, Agent, or Firm*—Ernest E. Helms

[57] ABSTRACT

A tensioning mechanism for a vehicle auxiliary seat which spans a space between first and second adjacent structures. In a preferred embodiment, the tensioning mechanism includes a; ratchet having a telescopically extended ratchet arm and wherein the ratchet can only be adjusted to a position tensioning the seat or adjusted to release the seat when the ratchet arm is extended.

1 Claim, 3 Drawing Sheets

TENSIONING MECHANISM FOR VEHICLE AUXILIARY SEAT

"This is a division of application Ser. No. 07/994,156 filed on Dec. 21, 1992."

BACKGROUND OF THE INVENTION

The background of the invention is that of vehicle seating, seating-related hardware and methods of utilization thereof. More particularly, the area of the present invention is that of a retractable auxiliary seat particularly useful in van or minivan type vehicles.

Most minivans have a maximum capacity of seven passengers. If all of the seats are to have the same width, the seating pattern is typically to have two front seats spaced one from another, three seats in a second row with very little spacing between them, and two seats in the rear row. The rear row typically has less lateral spacing due to the protrusion of wheel wells. With the two-three arrangement between the middle and rear rows, it has usually been found not to be preferable from a technical or economic standpoint to position the individual seats in floor-mounted rails if it is desirable for the seats to be removable, which typically for most minivans is highly desirable. It would be highly desirable if some type of auxiliary seating could be utilized in vans wherein one of the seats in the middle row could be removed and an auxiliary seat placed therein. It would also be desirable if the auxiliary seat could span different dimensions such as the spacing between driver-side and passenger-side outer seats in the second row and the space between the two seats in the rear row.

SUMMARY OF THE INVENTION

The present invention provides a tensioning mechanism for a removable auxiliary seat which can be placed between two separate seats or one seat and the van structure. Therefore, seating capacity or seating flexibility is greatly enhanced.

DETAILED DESCRIPTION OF THE DRAWINGS

Figures 1, 2:
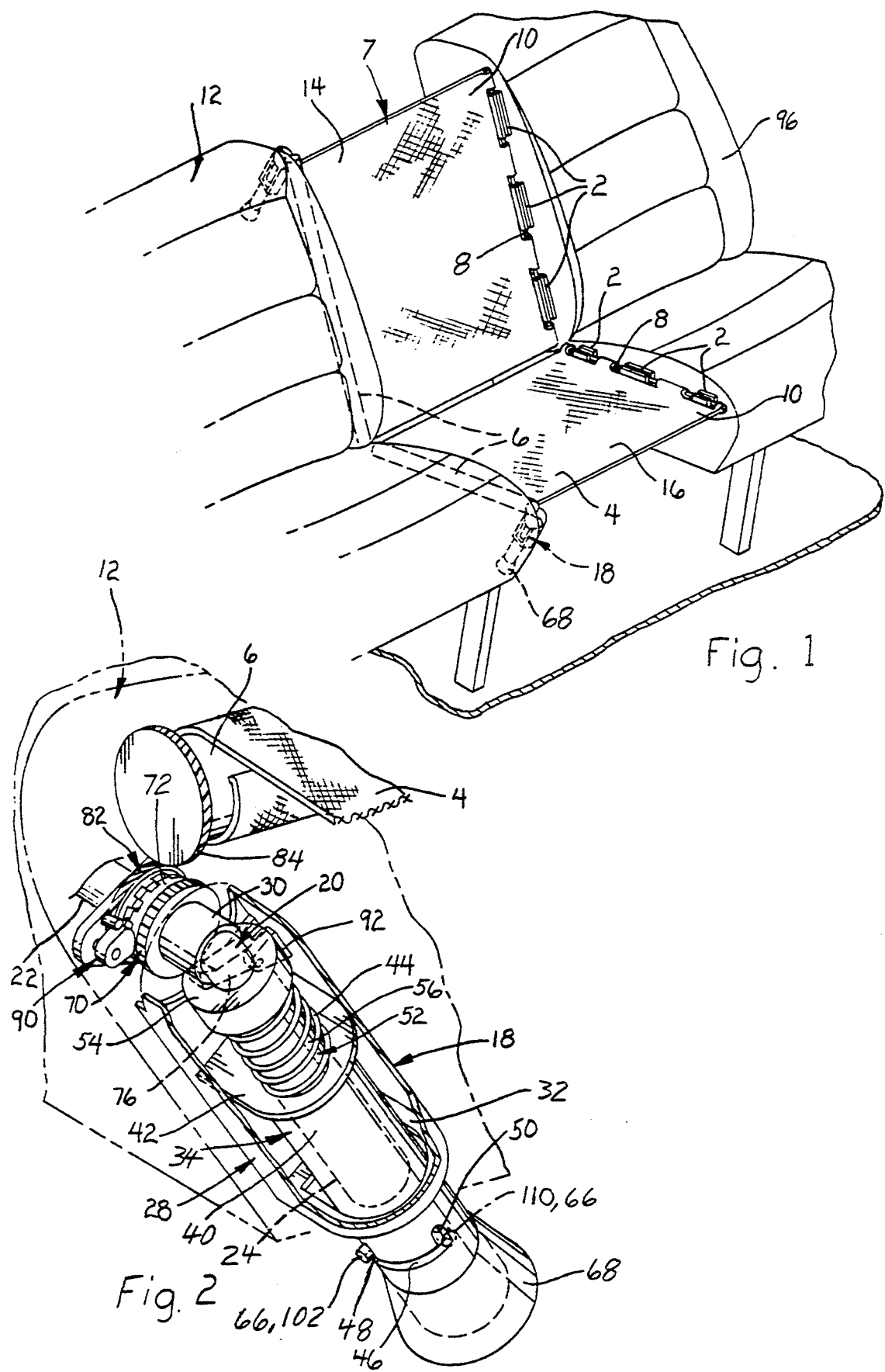
FIG. 1 is a perspective view of a preferred embodiment seat according to the present invention.
FIGS. 2 through 5 are perspective views of the ratchet mechanism utilized in the present invention with portions enlarged, sectioned and/or removed for clarity of illustration.
Figure 3:
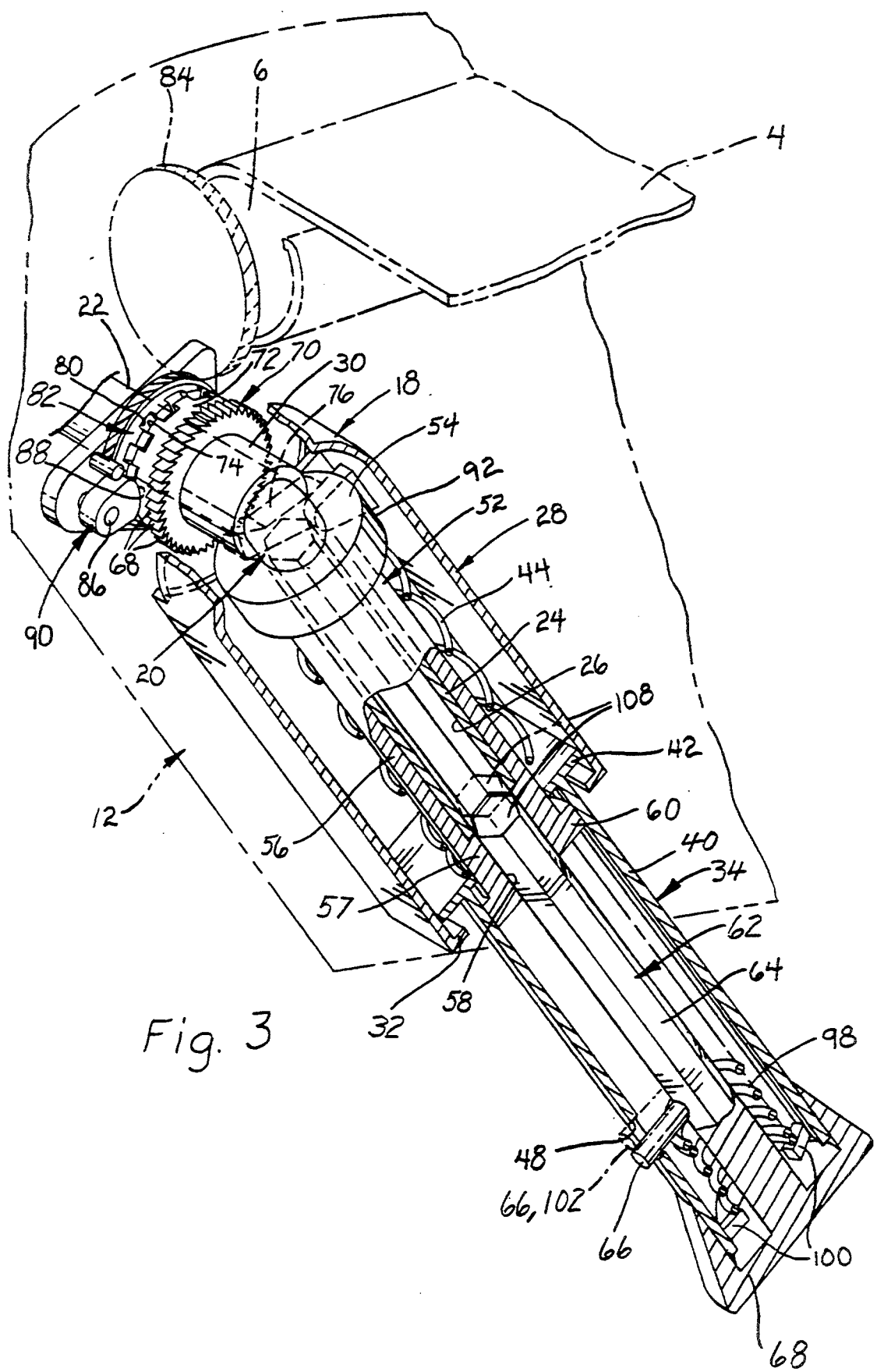
Figure 4:
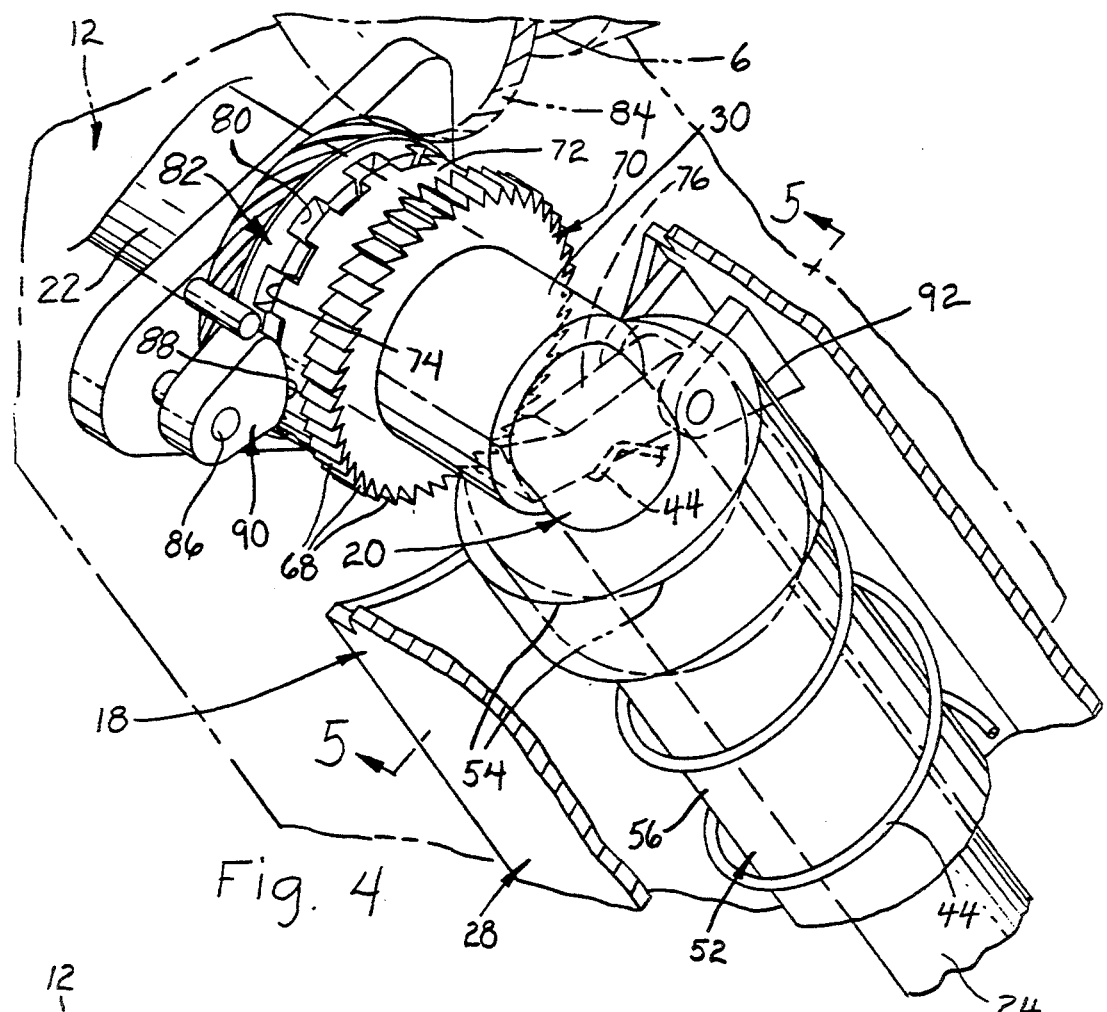

Referring to FIGS. 1 through 5, the vehicle auxiliary seat 7 is shown in its assembled position extending between the outer seats of a second row of a minivan vehicle. Although not shown, the auxiliary seat could be extended between the two seats of the front or rear row of seating or between one seat and the side wall of the vehicle. The seating material 4 is made of a sheet of seating fabric. Typical materials may be Duoflex or Dymatrol or other materials such as Sisiara may be utilized since they also will provide a suspension feature.

The sheet free end 10 has an encircled rod 8 which is entrappeal by a set of hooks 2 on one seat and extends off a roller 6 which is rotatably mounted to the passenger side seat 12 as shown. A contour can be given to the seating surface by using a contoured roller, if desired. Since the seat back 14 and the seat bun 16 of the auxiliary seat 7 are essentially the same except for dimensions and possible contouring of the roller 6, only one will be described.

To tension the seating sheet after it has been extended, there is provided a ratchet 18. The ratchet 18 has an L-shaped rod 20. The short end 22 of the L-shaped rod extends into the vehicle seat 12 and is rotatably mounted into a frame (not shown) thereof. A long end 24 of the L-shaped rod extends at generally a 90 degree angle and has a polygonal (as shown, hexagonal) bore 26.

An outer case 28 is fixably connected (attachment not shown) to the short arm of the L-shaped rod short end 22 via mounting to a spacer member 30. Spacer 30 may be fixed or rotatively fitted upon the L-shaped rod short end 22. The outer case 28 is typically fabricated from a polymeric material being hollow and having a lip 32 at its projected end. The outer case 28 has a generally D-shaped cross-section.

Telescopically, slidably mounted on the outer case 28 is an inner case 34. The inner case 34 has a main body 40 which is essentially tubular in configuration. Joined to the main body 40 is a flange 42, which is generally D-shaped. The flange 42 is encased within by the D-shaped cross-sectional opening of the inner case 28, thereby preventing the inner case 34 from rotating with respect to the outer case 28. The D-shaped flange 42 of the inner case also has connected thereto a cylindrical spring 44 which has its opposite end grounded with the outer case 28 generally adjacent an intersection of the L-shaped rod's long and short ends ? 4, 22. Therefore, the inner case 34 is spring-biased into a retracted position within the outer case 28.

The inner case 34 has a generally 90 degree radial slot 46 which is joined by two longitudinal slots 48, 50 which extend toward the outer case.

Slidably mounted on the long end 24 of the L-shaped rod is a cam robe 52. The cam robe 52 at its end most adjacent the short end 22 of the L-shaped rod has an eccentric cam ring 54. The cam robe 52 has means of axial retention on the L-shaped rod 20 such as a groove, snap fit or retainer ring (not shown) allowing the cam robe 52 to rotate on the L-shaped rod 20. Joined to the cam ring 54 is a tubular portion 56 of the cam robe. An opposite end of the cam robe 52 has a plug 57 with a hexagonal bore 58 matching the hexagonal bore 26 within the long end 24 of the L-shaped rod 20. The hexagonal bore 58 extends beyond and is aligned with the hexagonal bore 26 of the L-shaped rod long end 24. Additionally, the cam robe 52 has a connected disc head 60 which allows the cam robe 52 to be slidably mounted within the inner case 34 tubular portion 40.

Fitted within the hexagonal bore 58 of the cam robe and the hexagonal bore 26 of the L-shaped rod long end is a pin member 62. The pin member 62 as described has a hexagonal shaft 64. Joined to the hexagonal shaft 64 is an arm member 66 which extends through the slots 46, 48, 50 of the inner case 34. At the head of the pin 62 is a generally inverted conical-shaped head 68 having the apex portion removed.

Pivotally mounted to an inside surface of the outer case 28 is a ratchet pawl 76. The ratchet pawl 76 is spring biased in a given angular direction position by engagement with the same spring 44 which engages the inner case 34 to a retracted position with the outer case 28.

The ratchet pawl 76 makes contact with teeth 68 of an input gear 70. The input gear 70 is rotatably mounted on the short arm 22 of the L-shaped rod. The input gear 70 also has connected thereto an associated dram 72 and a clutch face 74. The clutch face 74 of the input gear 70 faces a clutch face 80 of an output gear 82. The input gear 70 is spring biased away from the output gear 82 by a coal spring (not shown) captured between the two gears 70, 82. The output gear 82 is torsionally associated, directly or via a gearing arrangement, with a gear 84 which torsionally turns the roller 6.

Figure 5:
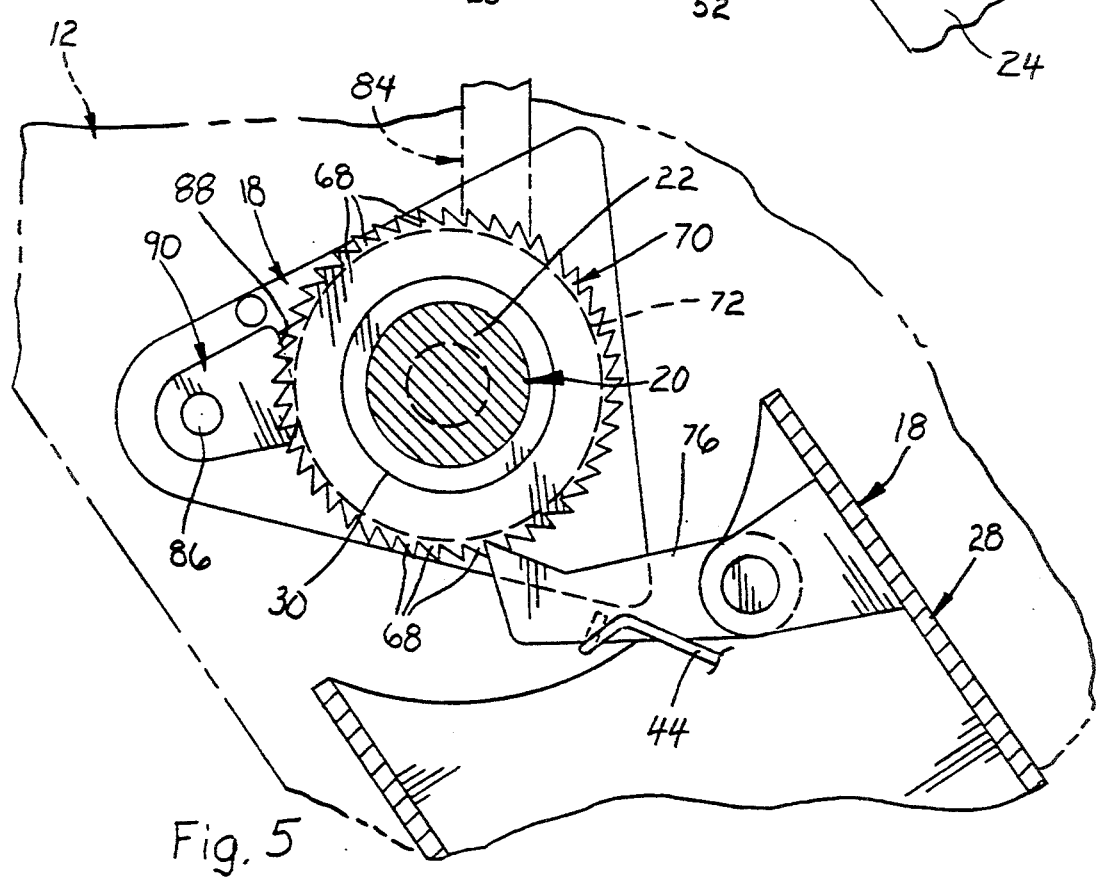

Pivotally connected with the seat via a pin 86 is an eccentric roller 90 with an eccentric cam face 88 which is engaged with the drum 72. A unidirectional torsional lock for the input gear 70 is provided by the combination of roller 90 and drum 72 by virtue of roller; 90 restraining the drum 72 of the input gear from rotating in a direction which would relieve tension in the sheet means (counterclockwise as shown in FIG. 5).

To engage the input gear clutch face 74 with the output gear clutch face 80, the cam tube 52 must be rotated to a position wherein the eccentric cam 54 pushes the input gear 70 against the spring biasing to mate with the output gear 82. When the cam tube 52 is rotated in the proper direction, then the input gear 70 will mate with the output gear 82 (causing surface 92 to come in contact with input gear 70). After mating of the gear faces 74 and 80, a manual pull on inner case 34 will cause the ratchet pawl 76 to engage with the teeth 68 of the input gear 70 to tension the roller 6. On return stroke, the input gear 70 will be kept from rotating in the wrong direction by the eccentric surface 88 of the roller cam contact with the drum 72. The ratchet pawl 76 will just skip over the teeth 68 due to the angular orientation of the teeth 68.

When the ratchet 18 is in the rest position, the inner case 34 will be retracted within the outer case 28. The hexagonal shaft 64 of the pin 62 will be mated within the hexagonal bore 26 of the L-shaped rod long rod. Therefore, the pin 62 and the cam tube 52 cannot be rotated. Therefore, the cam tube 52 will be locked in whatever position it is in. Typically, the cam tube 52 will be in the released position. Therefore, the input gear 70 will be spring biased away from the output gear 82 and their clutch faces 74, 80 will not be mating, allowing the roller 6 to freewheel. After the sheet 4 is pulled out and attached to an opposing seat 96, it is desirable to tension the sheet 4. The inner case 34 will be pulled out to its extended position. Another spring 98 (FIG. 3) within the inner case 34 mates with inner ledges 100 of the inner case and pushes down on the arm 66. Therefore, the arm 66 is held in an extreme position 102 in the slot 48. The above insures that the pin shaft 64 is locked in whatever angular position it is in with respect to the inner case 34 by virtue of its engagement within the bore 26 of the L-shaped rod long end. To tension the sheet, the pin head 68 is pulled outward and then rotated 90 degrees, allowing the arm 66 to sequentially travel in slot 48 against the biasing of spring 98 and then travel radially within the slot 46. The pin shaft end 108 will be removed from engagement with the L-shaped rod bore 26 with the pull on the pin 62. Removal of the pin shaft 64 from the bore 26 will allow the turning of the pin shaft 64 and cam tube 52 with respect to the outer case 28 and inner case 34.

The 90 degree rotation of the cam tube allows the surface 92 of cam tube 52 to now engage the input gear 70 with the output gear 82. Releasing the pin head 68 (while holding the inner case 34) will allow the arm 66 to be forced to an extreme position 110 (FIG. 2) to re-insert the shaft end 108 into the bore 26, thereby locking the pin shaft 64 and cam tube 52 in an engaged position. The sheet 4 may then be tensioned by pulling on the inner case, which is extended. When the proper extension has been imparted to the sheet 4, the inner case 34 is simply released and spring biased back into the outer case 28.

Since the hexagonal pin has re-entered the hexagonal bore 26 of the L-shaped rod (which prevents any rotation of the cam tube 52), the tension in the sheet 4 is "locked in". The sheet 4 can be further tightened; however, it cannot be released. To release the sheet, the inner case 34 must again be extended and the pin 62 extended outward, rotating arm 66 to position 110, thereby rotating the cam tube 52 to the release position, disengaging the input gear 70 from the output gear 82. The sheet 4 can then be released from its connected other seat 96. The pin 62 can then be moved to retension the sheet 4 and the ratchet 18 can be utilized to roll up the sheet 4 and store it for its next usage.

Accordingly, while the invention has been described in terms of a specific embodiment thereof, it will be appreciated that other forms could readily be adapted, and therefore the scope of the invention is to be considered limited only by the following claims.

The embodiments of the invention in which an exclusive property or privilege is claimed are defined as follows:

1. A tensioning mechanism for a vehicle auxiliary seat which includes a sheet connected on a roll comprising:
    an output gear for providing a torsional output to the roll;
    an input gear for providing a torsional input to the output gear;
    a unidirectional torsional lock to prevent rotation of the input gear in an opposite direction to a first rotational direction;
    a normally disengaged clutch to operatively connect the output gear with the input gear; and
    a ratchet arm having a rotatively-mounted cam to engage the clutch and the ratchet arm allowing impartation of torsional movement to the input gear.

* * * * *